United States Patent [19]

Mueller et al.

[11] Patent Number: 4,702,358
[45] Date of Patent: Oct. 27, 1987

[54] CLUTCH BRAKE STEERING CONTROL

[75] Inventors: James P. Mueller, East Peoria; Weldon L. Phelps, Dunlap, both of Ill.

[73] Assignee: Caterpillar Inc., Peoria, Ill.

[21] Appl. No.: 917,761

[22] Filed: Oct. 10, 1986

[51] Int. Cl.<sup>4</sup> ............................................. F16D 67/04
[52] U.S. Cl. ................................. 192/13 R; 180/6.7; 364/426
[58] Field of Search ........................ 192/13 R, 12 C; 180/6.7; 364/426

[56] References Cited

U.S. PATENT DOCUMENTS 3,727,710  4/1973  Sanders ................................. 180/6.7

FOREIGN PATENT DOCUMENTS 2144381  3/1985  United Kingdom .

Primary Examiner—Rodney H. Bonck
Attorney, Agent, or Firm—Terry D. Morgan

[57] ABSTRACT

Clutch-brake steering systems are known to operate on track vehicles which are highly reliable and cost effective, but lacked the fine degree of controllability found in the more expensive differential steering. An electronically controlled clutch-brake steering control apparatus provides control signals to electrohydraulic proportional valves for accurately modulating the control pressures of a set of steering clutches and brakes. A pair of sensors deliver signals, which are indicative of track speed, to the control apparatus. The apparatus acts to adaptively adjust selected ones of the valves to maintain a desired track speed differential. Thus, the controllability of the clutch-brake steering system is enhanced to effectively compete with more expensive and complex systems.

11 Claims, 4 Drawing Figures

CLUTCH BRAKE STEERING CONTROL

DESCRIPTION

1. Technical Field

This invention relates generally to an apparatus for controlling a clutch-brake mechanism for use in vehicles which are steered-by-driving and, more particularly, to a closed loop electronic control of the clutch-brake mechanism.

2. Background Art

In the field of track-type tractors, two methods of steering are commonly employed, each method having respective advantages and disadvantages in view of the other. The first of these methods controls steering through the use of a pair of clutch-brake mechanisms respectively located in the driveline of each track. The operator controls the direction of travel by moving a steering lever which regulates actuation pressure to permit "slipping" of the clutch of one of the tracks over a first range of lever operation. The power delivered to the "slipped" track is reduced and the slipped track slows relative to the other track. Ideally, the vehicle gradually turns in the direction of the "slipped" track.

Smaller radius turns are performed by further actuating the steering lever into a second range of operation where the brakes are engaged on one of the track drives. With the brake engaged, the track speed of the one track is drastically reduced, resulting in a larger speed differential and a smaller turning radius. However, turning radius and direction of travel are not entirely dependent upon steering lever actuation. For example, track-type tractors have a significant mass which can have undesirable effects on the operation of the steering when the tractor is operated on a grade. When the vehicle is traveling down a grade and the operator requests a gradual left turn, such that the left track clutch is released, the mass of the vehicle can cause the left track to actually increase in velocity and begin a gradual turn to the right. Operation of the vehicle in a direction opposite to the expected direction has obvious repercussions in controllability; however, inconsistent steering response is an equally undesirable feature. For example, when the vehicle is traveling up a grade and the operator requests a gradual turn, the mass of the vehicle can cause the velocity of the left track to decrease significantly and the vehicle will unexpectedly turn sharply to the left. Clutch-brake steering mechanisms are in wide use on track-type tractors owing to their simple construction, superior performance in straight ahead work applications, and are relatively inexpensive.

The second of these methods controls steering through the use of a continuously driven steering differential which, rather than interrupt the flow of power to one of the tracks, acts to reduce the speed of the selected track and increase the speed of the opposite track. Such "powered" turns extend the application of the vehicle into areas of marginal ground conditions where the clutch-brake steered vehicle would be unable to operate. Moreover, the differential steered vehicle overcomes the disadvantages of clutch-brake steering as the vehicle will exhibit consistent steering response in both the radius and direction of turn. However, the differential steered system has drawbacks in the cost/performance area of large track-type vehicles. As the size of the vehicle increases, the size and capacity of the steering components must necessarily also increase. The cost of such components are not linearly related to the size and capacity, but increase dramatically with corresponding physical changes. Therefore, differential steering on large track-type tractors is an expensive alternative to clutch-brake steering.

The present invention is directed to overcoming one or more of the problems as set forth above.

DISCLOSURE OF THE INVENTION

In accordance with one aspect of the present invention, there is provided a vehicle having a pair of tracks in which driving force is applied to the tracks thereof. The vehicle includes clutch and brake systems associated respectively with the tracks of each side thereof and responsive to a source of fluid pressure for steering of the vehicle. Each clutch and brake system comprises a clutch alternately engageable and disengageable to respectively connect and disconnect the driving force applied to the track of the vehicle, and a brake alternately actuatable and releasable to respectively brake and release the track of the vehicle. A control apparatus for the clutch and brake steering system comprises separate clutch and brake valve means to respectively control the fluid pressure delivered to the clutch and brake in response to receiving separate electrical control signals. A first means determines a desired velocity differential between the tracks while a second means delivers first and second signals correlative to the respective velocities of each of the tracks. A processor means receives the first and second track velocity signals, determines the differential therebetween, compares the determined and desired velocity differentials to determine the differential error, delivers a control signal to the clutch valve means of one of the tracks in response to the error being less than a preselected setpoint, and delivers a control signal to both the clutch and brake valve means of the one of the tracks in response to the error being greater than the preselected setpoint.

Prior track-type tractor steering systems have commonly employed either a clutch-brake steering system for its low cost or a differential steering system for its controllability. The advantages and disadvantages of the two systems are complimentary in nature such that the advantage of one system is the disadvantage of the other. The present system provides a low cost clutch-brake steering system with the controllability of a differential steering system.

BEST MODE FOR CARRYING OUT THE INVENTION

Figure 1:
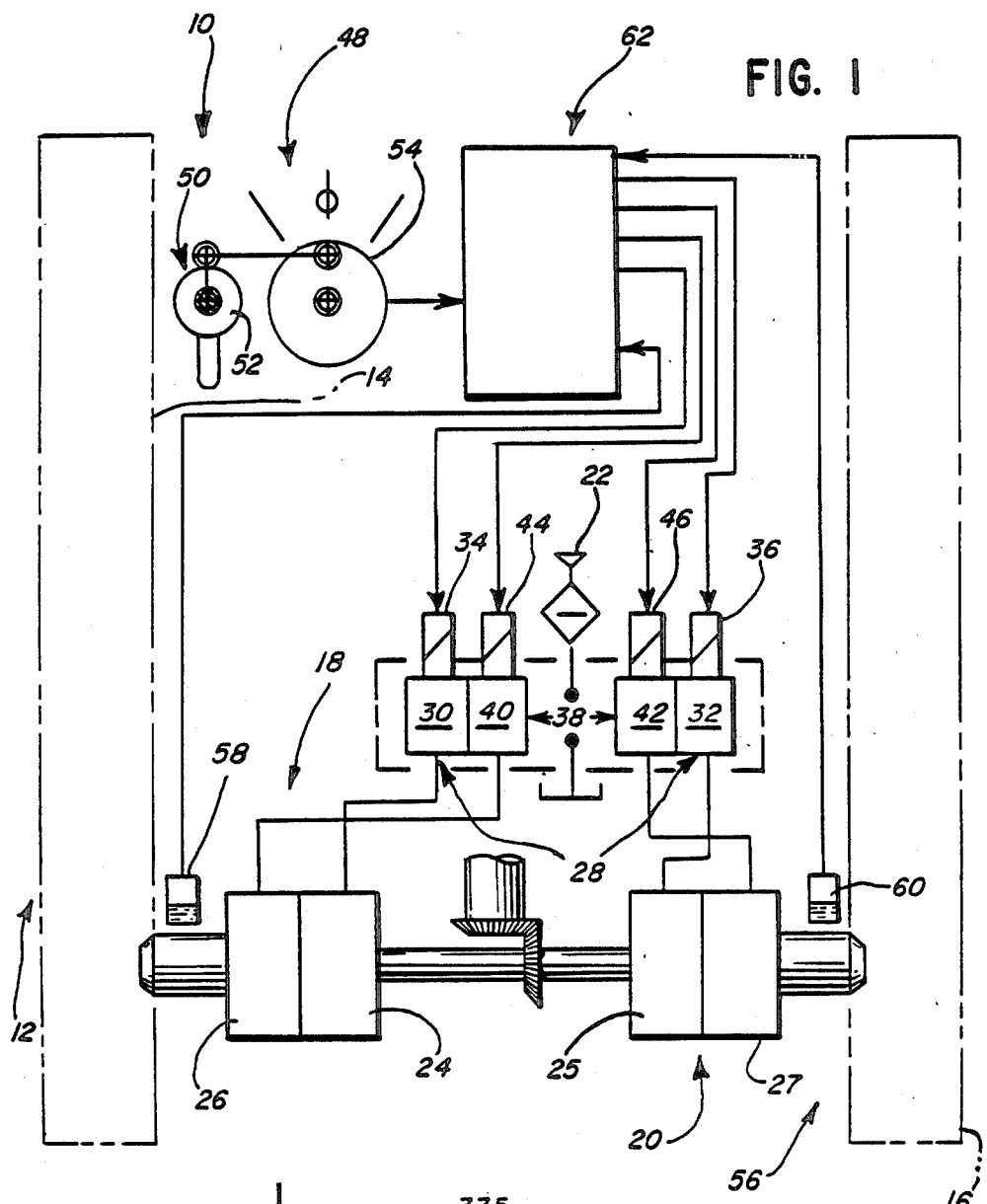
FIG. 1 illustrates a block diagram of an embodiment of the present invention.

Referring now to the drawings, wherein a preferred embodiment of the present apparatus 10 is shown, FIG. 1 illustrates a vehicle 12 with left and right tracks 14,16. Driving force is applied to the tracks 14,16 through a respective pair of left and right clutch and brake systems 18,20 which are responsive to a source 22 of fluid pressure to steer the vehicle 12. The clutch and brake system 18,20 are of conventional design in common use on track-type tractors wherein each of the systems 18,20 includes a clutch 24,25 which is alternately engageable and disengageable to respectively connect and disconnect the driving force applied to the tracks 14,16 of the vehicle 12. The clutch 24,25 is hydraulically operated with pressure acting to engage the clutch. More specifically, in the preferred emobodiment the clutch 24,25 is fully engaged and transferring power to the tracks 14,16 at 335 psi. At 0 psi, the clutch 24,25 is fully disengaged with no power being transferred to the tracks 14,16. At pressures intermediate these extremes, the clutch 24,25 "slips" by a percentage proportional to the control pressure and only a portion of the power is transferred to that track 14,16. Precise modulation of the control pressure can produce an accurate speed differential between the tracks 14,16. The magnitude of the control pressure varies in direct proportion to the magnitude of the electrical control signal. A loss of hydraulic pressure will necessarily result in the clutch 24,25 being fully disengaged to remove power from the tracks 14,16 as a failsafe condition.

Similarly, the clutch and brake systems 18,20 also include a brake 26,27 alternately actuatable and releasable to respectively brake and release the tracks 14,16 of the vehicle 12. Typically, the brake 26,27 is a hydraulically operated disc type with pressure acting to disengage the spring applied brake. For example, in the preferred embodiment, a brake pressure of 335 psi fully disengages the brake 26,27 while a reduced pressure of 33 psi fully engages the brake 26,27. Correspondingly, an intermediate pressure of 250 psi results in initial braking which is commonly referred to as "touch up". A loss of hydraulic pressure will necessarily result in the brakes 26,27 being fully spring engaged to stop the vehicle 12 as a failsafe condition.

The control apparatus 10 for the clutch and brake steering system includes a clutch valve means 28 for controlling the fluid pressure delivered to the clutches 24,25 in response to receiving an electrical control signal. The clutch valve means 28 includes separate, alternately actuatable electrohydraulic proportional valves 30,32 connected for modulated fluid communication between a fluid pressure source 22 and each of the clutches 24,25. The valves 30,32 are of conventional design and each includes an inductive coil 34,36 for controlling the position of a valve stem (not shown) to maintain the control pressure at a preselected value. The magnitude of the control pressure is variable in direct proportion to the magnitude of the electrical control signal.

Similarly, a brake valve means 38 controls the fluid pressure delivered to each of the brakes 26,27 in response to receiving an electrical control signal. The brake valve means 38 includes separate, alternately actuatable electrohydraulic proportional valves 40,42 connected for modulated fluid communication between the fluid pressure source 22 and each of the brakes 26,27. The valves 40,42 are of conventional design and each includes an inductive coil 44,46 for controlling the position of a valve stem (not shown) to maintain the control pressure at a preselected value. The magnitude of the control pressure is variable in direct proportion to the magnitude of the electrical control signal.

A means 48 determines a desired velocity differential between the tracks 14,16 from a manual input via a vehicle operator. The operator controls vehicle direction in a typical manner through the manual operation of a steering lever 50. In the preferred embodiment, the steering lever 50 is a tiller bar 52 connected to and rotatable with a sensor 53 which, in the preferred embodiment, is a rotary potentiometer 54. Both the tiller bar 52 and potentiometer 54 are spring centered, such that in the absence of operator input, the rotary potentiometer 54 will return to a neutral position and the means 48 will request a zero track velocity differential.

A means 56 delivers first and second signals correlative to the respective velocities of each of the tracks 14,16. A pair of inductive sensors 58,60 are positioned adjacent a toothed gear (not shown) which rotates at a velocity directly related to the track velocity. The varying flux density results in each of the inductive sensors 58,60 delivering a signal which has a frequency related to the respective gear and track velocity. The signal is a digital pulse signal with a frequency and pulse duration related to track velocity. These sensors 58,60 are standard components and commercially available.

The first and second digital signals delivered by the inductive sensors 58,60 are received by a processing means 62 which acts under software control to determine the actual frequency of each of the signals. Because the frequency of the signals is directly related to track velocity, the processing means 62 determines the velocity differential between the tracks 14,16 by subtracting one velocity from the other. The desired velocity differential determined by means 48 is also received by the processing means 62 which compares the actual and desired velocities to determine a differential error. The processing means 62 attempts to control the clutch 24,25 and brake 26,27 of each track 14,16 to reduce the differential error to zero. The magnitude of the correction effected by the processing means 62 is directly related to the magnitude of the differential error. For example, a control signal is delivered to the clutch valve means 28 of one of the tracks 14,16 in response to the differential error being less than a preselected setpoint. Similarly, a control signal is delivered to both the clutch and brake valve means 28 of one of the tracks 14,16 in response to the differential error being greater than a preselected setpoint.

Figure 2:
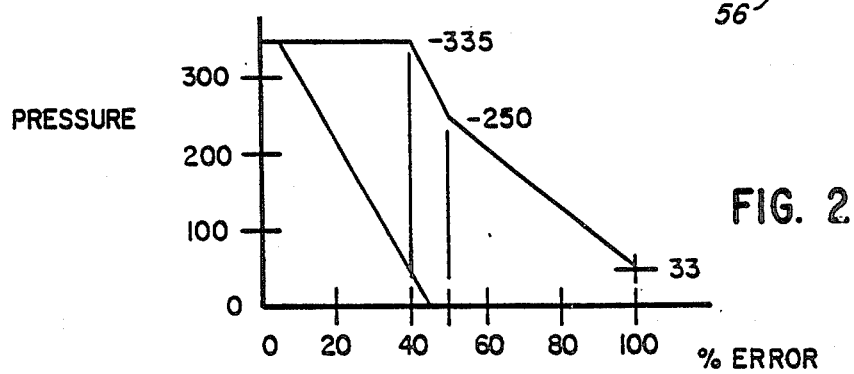
FIG. 2 illustrates a graphical representation of the clutch and brake control pressure.

FIG. 2 graphically illustrates pressure traces for the clutch 24 and brake 26 operation versus the percent differential error. At 0 percent error, the clutch 24 and brake 26 are both pressurized at 335 psi such that the brake 26 is fully disengaged and the clutch 24 is fully engaged. The control apparatus 10 takes no corrective action until the differential error exceeds approximately five percent. Between five and 45 percent error, the clutch pressure is incrementally reduced to 0 psi. Correspondingly, between forty and fifty percent, the brake pressure is incrementally reduced at a preselected rate to 250 psi (touch up). Between fifty and one-hundred percent error, the brake pressure is varied between 250 psi and 33 psi at a second preselected rate less than the first preselected rate. Operation outside this range of pressure has no effect on the track velocity as at 33 psi the brake 26 is fully engaged and any further reduction in the control pressure has no effect on the brake 26.

Figure 3:
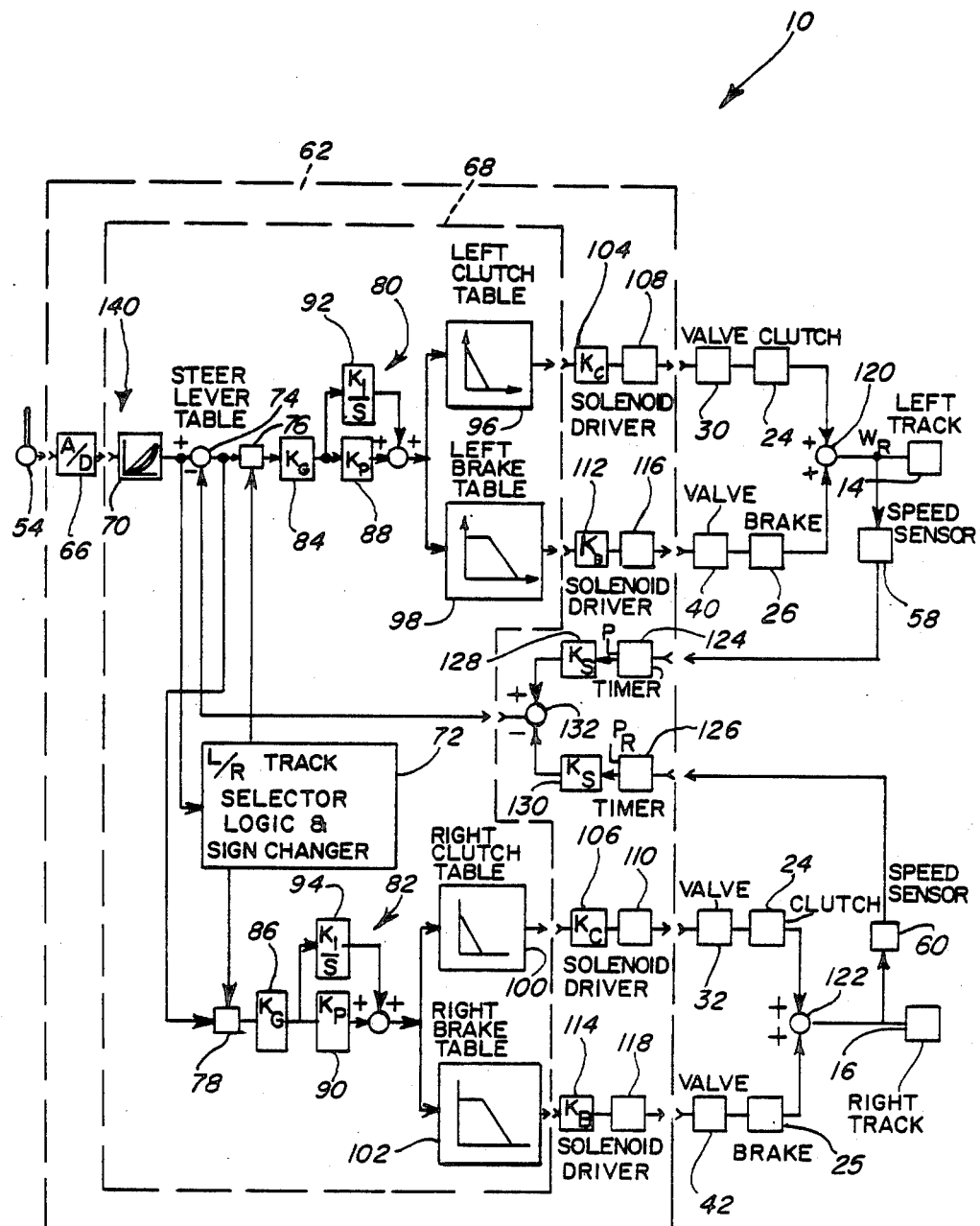
FIG. 3 illustrates a block diagram of the control software for an embodiment of the present invention.
Figure 4:
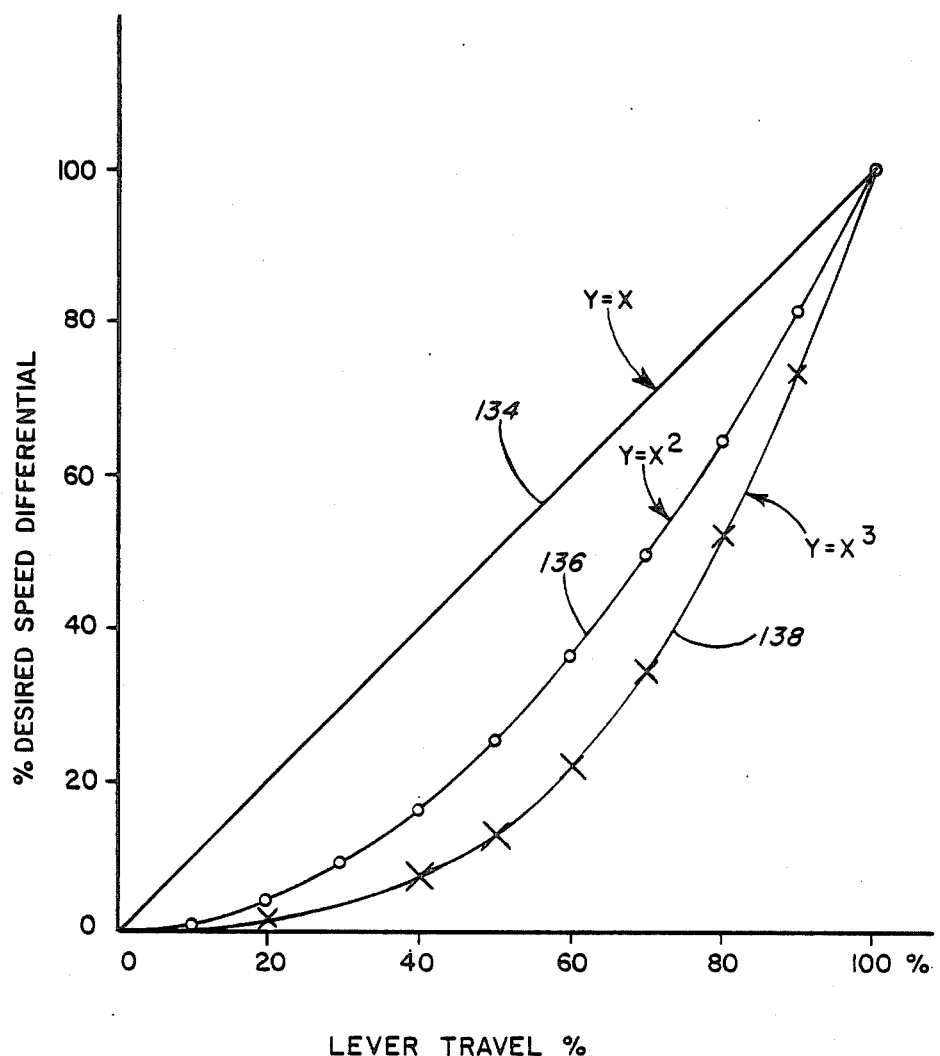
FIG. 4 illustrates a graphical representation of steering lever travel versus vehicle turning radius.

FIG. 3 diagrammatically illustrates a functional schematic of the control apparatus 10 and, in particular, shows the software employed by the processing means 62. A dashed line generally indicates the processing means 62 and includes an analog to digital converter (A/D) 66 having an input connected to the tap of the rotary potentiometer 54. The output of the A/D 66 is used by a microprocessor 68 to access a look-up table 70 and determine the desired speed differential. The look-up table 70 is illustrated in FIG. 4 and discussed in greater detail later in this specification. It is sufficient to understand that the position of the rotary potentiometer 54 is related to a desired track speed differential.

The output from the A/D 66 is also delivered to the input of a selector 72 which determines the direction of the desired turn. For example, if the potentiometer center voltage is 0 volts, then the selector 72 will recognize any positive voltage as a request for a left turn. Similarly, any negative voltage will initiate a right turn. The output from the look-up table 70 is delivered to the positive input of a summer 74. The negative input of the summer 74 receives the actual track speed differential such that the output of the summer 74 is the differential error signal. The magnitude of the differential error signal is used by the microprocessor 68 to ultimately control the clutch 24,25 and brake 26,27 of either the left or right track 14,16. The selector 72, having previously determined the direction of the requested turn, selectively operates one of a pair of gates 76,78 which are respectively associated with the left and right tracks 14,16. When energized by the selector 72, the gates 76,78 pass the differential error signal to one of a pair of identical control equations 80,82 respectively associated with the left and right tracks 14,16. Each of the control equations includes a weighting factor 84,86, a proportional term 88,90, and an integral term 92,94. The results of the control equations 80,82 are used by the microprocessor 68 to respectively access a left clutch and brake look-up table 96,98 and a right clutch and brake look-up table 100,102 similar to the pressure trace illustrated in FIG. 2. However, the look-up tables 96,98,100,102 have voltage levels which should be delivered to the proportional valves 30,32,40,42 to generate the desired pressures illustrated in FIG. 2.

The outputs of the left and right clutch look-up tables 96,100 are passed through a pair of weighting factors 104,106 to the inputs of a pair of solenoid driver circuits 108,110 which respectively control the clutch valves 40,42. Similarly, the outputs of the left and right brake look-up tables 98,102 are also passed through a pair of weighting factors 112,114 to the inputs of a pair of solenoid driver circuits 116,118 which respectively control the brake valves 30,32. The effect of the clutch 24 and brake 26 operation on the tracks 14,16 is shown functionally as the output of a pair of summers 120,122 where the inputs to the summer 120,122 are the clutch 24 and brake 26.

The track speed sensors 58,60 each deliver a digital signal which has a frequency and pulse width duration related to the speed of each of the respective tracks 14,16. Timers 124,126 receive the track speed sensor signals and provide signals related to the pulse duration and correspondingly the speed of each track 14,16. These track speed signals are passed through a pair of weighting factors 128,130 to the positive and negative inputs of a summer 132. The output of the summer 132 is necessarily the actual track speed differential which is delivered to the negative input of the summer 74.

The weighting factors 104,106,112,114,128,130 are employed to allow the control apparatus 10 to be easily reconfigured for a variety of vehicles or components. For example, the track speed weighting factors 128,130 are used to correlate the pulse width signal to an actual track velocity. The pulse width is not only dependent upon the track speed, but is also influenced by the number of gear teeth being inductively sensed. If the control apparatus 10 were to be used on a variety of vehicles with a range of gear sizes, the track speed signal could be calibrated by simply reprogramming the weighting factor. Operation of the remaining weighting factors is similar in nature.

Referring now to FIG. 4, wherein a graph of percentage of desired speed differential versus percentage of lever travel is shown. Three separate traces 134,136,138 are illustrated with the first trace 134 being linear. In first trace 134, lever travel is directly proportional to the desired speed differential, such that the sensitivity is constant over the entire range of lever travel. For example, any five percent change in lever position results in a five percent change in desired speed. However, it can be desirable to increase the sensitivity of the lever in a range of lever travel where fine control is necessary. Typically, this fine control is needed when performing large radius turns. For example, in straight ahead tracking, it is frequently necessary to make minor steering corrections to maintain the vehicle heading. If such corrections are relatively coarse, the operator will have a tendency to oversteer the vehicle and oscillate about the desired path. Conversely, in this mode of operation, a fine control allows the operator to accurately perform minor steering corrections.

The means 48 for determining the desired track velocity differential includes a means 140 which receives the steering lever position signal and delivers the desired velocity differential signal having a magnitude which has a nonlinear relationship to the magnitude of the lever position signal. In a first embodiment, illustrated as trace 136, the desired velocity differential signal is the square of the magnitude of the lever position signal. Using trace 136, the controllability of the vehicle 12 is greatly enhanced in the lever travel range of large radius turns. For example, from zero to twenty percent change in lever position results in only a four percent change in desired speed differential.

In a second embodiment, illustrated as trace 138, the desired velocity differential signal is the cube of the magnitude of the lever position signal. Using trace 138, the controllability of the vehicle 12 is further enhanced in the lever travel range of large radius turns. For example, a change from zero to twenty percent in lever position results in less than a two percent change in the desired speed differential. In the preferred embodiment, the look-up table 70 is software programmed and maintained in nonvolatile memory such that changing between the illustrated traces 134,136,138 or any trace is a relatively easy programmatic change. Alternatively, each of the traces could be programmed into the memory and selected by the operator depending upon the particular application in which the vehicle 12 is used.

INDUSTRIAL APPLICABILITY

In the overall operation of the control apparatus 10, assume that the vehicle 12 is traveling in the forward direction and the operator has selected a left turn of approximately a twenty percent speed differential. The selector 72 recognizes that the operator is requesting a left turn and energizes the gate 76 to ultimately enable the left clutch 24 and brake 26 to slow the left track by the requested twenty percent. At the time of the initial request for the turn, the actual speed differential is approximately zero and the resultant speed differential error is approximately twenty percent.

The control equation 80 acts on the differential error and produces a percentage error signal which is used by the left clutch and brake look-up tables 96,98 to determine a desired clutch and brake valve control voltage. From FIG. 2 it can be seen that a twenty percent error has no effect on the brake operation, but reduces the clutch control pressure to approximately 200 psi and causes the clutch to begin slipping.

The speed sensor 58 monitors the left track 14 and an actual speed differential is detected and fed back to the summer 74. The adjusted speed differential is delivered to the control equation 80 which modifies the percentage error accordingly. The look-up tables 96,98 use the error to determine the valve control voltage and affect the left track speed. The process continues to repeat, adjusting the left track speed to match the desired differential speed as long as the operator continues to request the left turn.

Brake operation is unaffected at steering speed differentials below forty percent. However, the brake 26 does not actually provide a braking force below a fifty percent speed differential error. Between forty and fifty percent the brake 26 is adjusted from a fully disengaged position to a "touch up" position.

Operation of the tiller bar 52 by the operator to request a right turn is virtually identical to the left turn. The selector 72 energizes the gate 78 to ultimately enable the right clutch 25 and brake 27 to slow the right track by the requested percentage. Thereafter, operation is substantially similar to that of the left turn.

Other aspects, objects, and advantages of this invention can be obtained from a study of the drawings, the disclosure, and the appended claims.

We claim:

1. In a vehicle having a pair of tracks in which driving force is applied to the tracks thereof, including clutch and brake systems associated respectively with the tracks of each side thereof and responsive to a source of fluid pressure for steering of the vehicle, each clutch and brake system comprising a clutch alternately engageable and disengageable to respectively connect and disconnect the driving force applied to the track of the vehicle, and a brake alternately actuatable and releasable to respectively brake and release the track of the vehicle, a control apparatus for the clutch and brake steering system comprising:

clutch valve means for controlling the fluid pressure delivered to said clutch in response to receiving an electrical control signal;

brake valve means for controlling the fluid pressure delivered to said brake in response to receiving an electrical control signal;

means for determining a desired velocity differential between said tracks;

means for delivering first and second signals correlative to the respective velocities of each of said tracks;

processing means for receiving said first and second track velocity signals, determining the differential therebetween, comparing said determined and desired velocity differentials to determine the differential error, delivering a control signal to the clutch valve means of one of the tracks in response to the error being less than a preselected setpoint, and delivering a control signal to both the clutch and brake valve means of said one of the tracks in response to the error being greater than the preselected setpoint.

2. A control apparatus, as set forth in claim 1, wherein said clutch valve means includes separate, alternately actuatable electrohydraulic proportional valves connected for modulated fluid communication between said source of fluid pressure and each of said clutches.

3. A control apparatus, as set forth in claim 1, wherein said brake valve means includes separate, alternately actuatable electrohydraulic proportional valves connected for modulated fluid communication between said source of fluid pressure and each of said brakes.

4. A control apparatus, as set forth in claim 1, wherein said processing means delivers a control signal to said clutch valve means of a magnitude sufficient for fully disengaging said clutch in response to said steering signal being greater than a first preselected value.

5. A control apparatus, as set forth in claim 4, wherein said processing means delivers a control signal to said brake valve means of a magnitude sufficient for engaging said brake in response to said steering signal being greater than a second preselected value.

6. A control apparatus, as set forth in claim 5, wherein said second preselected value is greater than said first preselected value.

7. A control apparatus, as set forth in claim 6, wherein said processing means delivers a control signal to said brake valve means of a magnitude insufficient for engaging said brake in response to the magnitude of said steering signal being intermediate said first and second preselected values.

8. A control apparatus, as set forth in claim 6, wherein said processing means delivers control signals to said clutch valve and brake valve means of a magnitude sufficient to respectively fully engage said clutch and fully release said brake in response to said desired velocity differential being less than a preselected setpoint.

9. A control apparatus, as set forth in claim 1, wherein said means for determining a desired velocity differential includes a lever manually positionable at a plurality of locations, a sensor connected to and movable with the lever and adapted for delivering an electrical position signal having a magnitude correlative to the position of said lever, and means for receiving said position signal and delivering said desired velocity differential signal having a magnitude which has a nonlinear relationship to the magnitude of the position signal.

10. A control apparatus, as set forth in claim 9, wherein the magnitude of said desired velocity differential signal is the square of the magnitude of said position signal.

11. A control apparatus, as set forth in claim 9, wherein the magnitude of said desired velocity differential signal is the cube of the magnitude of said position signal.

* * * * *